(12) United States Patent
Ashikhmin et al.

(10) Patent No.: US 7,331,009 B2
(45) Date of Patent: Feb. 12, 2008

(54) METHOD AND APPARATUS FOR LINK ERROR PREDICTION IN A COMMUNICATION SYSTEM

(75) Inventors: Alexei Ashikhmin, Morristown, NJ (US); Adriaan J. De Lind Van Wijngaarden, New Providence, NJ (US); Nandu Gopalakrishnan, Chatham, NJ (US); Jaehyeong Kim, San Jose, CA (US); Emina Soljanin, Green Village, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 566 days.

(21) Appl. No.: 10/778,765

(22) Filed: Feb. 13, 2004

(65) Prior Publication Data
US 2005/0182994 A1    Aug. 18, 2005

(51) Int. Cl.
*G08C 25/02*    (2006.01)
*H04L 1/18*    (2006.01)

(52) U.S. Cl. ..................................... 714/748
(58) Field of Classification Search ................ 714/748, 714/749, 18
See application file for complete search history.

(56) References Cited

U.S. PATENT DOCUMENTS 6,782,497 B2 * 8/2004 Yue ............................ 714/704
2003/0142727 A1 * 7/2003 Monogioudis et al. ...... 375/147

OTHER PUBLICATIONS

Lampe et al., Per-Prediction for PHY mode selection in OFDM communication systems, 2003, IEEE, p. 25-29.*
Zhao et al., Reducing power consumption by utilizing retransmission in short range wireless network, 2002, IEEE conference on local computer network, p. 1-7.*
Cho et al., Linear prediction at base station for closed loop power control, 1999, IEEE, p. 1469-1473.*
European Search Report EP 05 25 0507 dated Apr. 29, 2005.

* cited by examiner

*Primary Examiner*—Shelly Chase

(57) ABSTRACT

A method is provided to accurately predict the probability of successfully recovering frames of (coded) information received over a wireless link, without having to decode the frame. This method includes receiving a first encoded signal and predicting link errors based on characteristics of the first encoded signal and variations in these characteristics before decoding the first encoded signal.

19 Claims, 4 Drawing Sheets

METHOD AND APPARATUS FOR LINK ERROR PREDICTION IN A COMMUNICATION SYSTEM

BACKGROUND OF THE INVENTION

1. Field of the Invention

This invention relates generally to a communications system, and, more particularly to a method for predicting the probability of successfully recovering frames of (coded) information received over a communications link.

2. Description of the Related Art

In a typical wireless communications session, information is transmitted to and from a mobile device over one or more links or channels with the information being grouped into segments or frames. A frame is a basic timing interval in the system and at the same time, a frame refers to the sequence of contiguous bits that represents the user and control information that is transmitted during this basic timing interval. A frame typically consists of one or several slots, the latter being the channel's unit time interval. In some applications, the frame duration and the signaling rate may vary substantially, depending, among other things, on the channel conditions and the number of active users. A frame may therefore consist of a sequence of user and control information, the length of which is determined by the frame duration and the signaling rate. The quality of the received signals that constitutes the frame strongly depends on the distance between the mobile and the receiver, the terrain, and the activity of other active mobile users. A mobile device may for example suddenly move to a region where interference may quickly but temporarily degrade the quality of the communications link. Various types of error control codes and (hybrid) automatic repeat request (ARQ) or incremental redundancy (IR) protocols are being used to make the frames more resilient against channel noise and interference. In some applications the information is encoded with convolutional codes or Turbo codes to assist in error correction of the frame.

The changes in the quality of the link may mean that the receiver does not accurately receive some or all of the transmitted signals. Consequently, some or all of the information contained within one or more frames may be degraded and it may or may not be possible to recover the transmitted information with the error control mechanisms and (re)transmission strategies that are in use. Error control codes are also typically used to determine whether or not the decoded frame information is error-free. The frame error rate (FER) is defined as the percentage of frames that still contains errors after decoding. In some applications, this rate is typically around 1%.

It would be very useful to accurately predict the frame error rate for a given error control code and (re)transmission strategy when only limited information about the signal strength and the interference is available. Such a prediction method would have multiple applications: in system design and development to quickly evaluate error control mechanisms and scheduling, and in actual mobile communication systems for instantaneous monitoring of the link level performance and for adaptively selecting the appropriate error control code, the signal power, the modulation type and the (re)transmission strategy for given (varying) channel conditions.

Such a procedure is useful to instantaneously provide valuable information, particularly in situations where the actually decoding of the frame would introduce too much latency. If the channel conditions are changing significantly over a short period of time, the error control code and retransmission strategy can be adapted immediately as long as the latency is small. That is, upon discovering that the link error probability has changed, the mobile device may attempt to adjust to the new situation be choosing a different error control code and retransmission'strategy such as to achieve the target link error rate. Quick and accurate estimation of the link error probability is useful in developing a communication system that swiftly adjusts to the channel conditions and provides relatively clear and uninterrupted communications.

Quick and accurate estimation of the link error probability has proven somewhat problematic. To accurately determine that a link error, i.e., a frame decoding error, has occurred, substantial analyses must be performed on a suspected erroneous frame of information. The analyses typically involve decoding the frame to retrieve and check the information, which requires a significant amount of computing power and inherently results in delays. To ensure accuracy, these analyses can take considerable time, which may make the communications relatively unresponsive. For example, when transmitting voice signals, a significant lapse in the time between receiving the frame and detecting that it is in error may make it impossible to adapt the methods to improve the transmission in a timely fashion. On the other hand, if the analyses are faster but less rigorous, frames may well be considered uncorrectable when in fact they can be corrected. With less rigorous analyses, the link error probability will be quite unreliable and not useful for adaptive control algorithms.

The present invention is directed to overcoming, or at least reducing, the effects of, one or more of the problems set forth above.

SUMMARY OF THE INVENTION

In one embodiment of the present invention, a method is provided. The method, comprises receiving a first encoded signal, and predicting link errors based on at least one characteristic of the first encoded signal before decoding the first encoded signal.

In another embodiment of the present invention, a method is provided. The method, comprises receiving a first encoded signal, and predicting link errors based on a signal to noise ratio of the first encoded signal before decoding the first encoded signal.

BRIEF DESCRIPTION OF THE DRAWINGS

The invention may be understood by reference to the following description taken in conjunction with the accompanying drawings, in which like reference numerals identify like elements, and in which.

Figure 1:
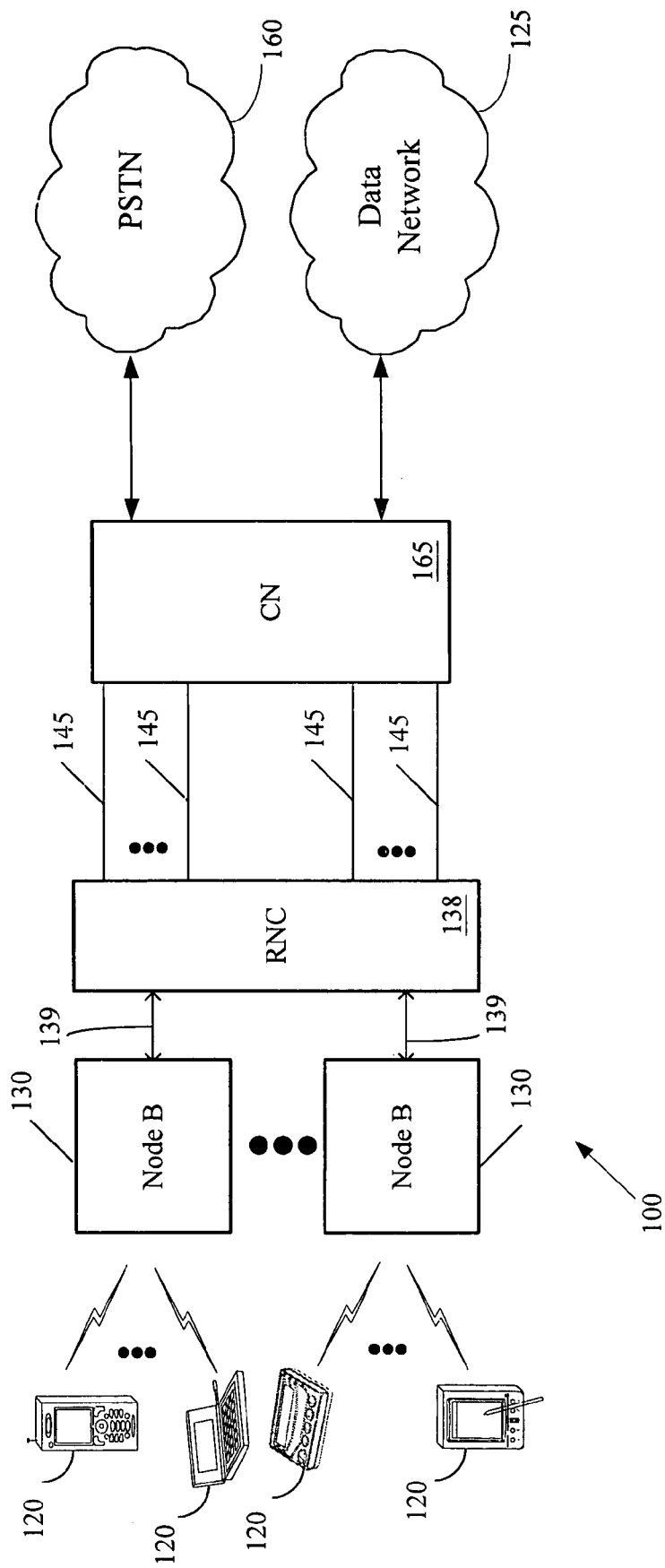
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 may be a 1xEV-DO system, although it should be understood that the present invention may be applicable to other systems that support data and/or voice communication. The communications system 100 allows one or more access terminals 120 to communicate with a data network 125, such as the Internet, through one or more base stations (BTS) 130. The access terminal 120 may take the form of any of a variety of devices, including cellular phones, personal digital assistants (PDAs), laptop computers, digital pagers, wireless cards, and any other device capable of accessing the data network 125 through the BTS 130.

In one embodiment, a plurality of the BTSs 130 may be coupled to a Radio Network Controller (RNC) 138 by one or more connections 139, such as T1/EI lines or circuits, ATM circuits, cables, optical digital subscriber lines (DSLs), and the like. Although only a single RNC 138 is illustrated, those skilled in the art will appreciate that a plurality of RNCs 138 may be utilized to interface with a large number of BTSs 130. Generally, the RNC 138 operates to control and coordinate the BTSs 130 to which it is connected. The RNC 138 is, in turn, coupled to a controller (CN) 165 via a connection 145, which may take on any of a variety of forms, such as T1/EI lines or circuits, ATM circuits, cables, optical digital subscriber lines (DSLs), and the like.

The data network 125 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

It should be understood that the configuration of the communications system 100 of FIG. 1 is exemplary in nature, and that fewer or additional components may be employed in other embodiments of the communications system 100. For example, in one embodiment, the system 100 may include a network management system (not shown) that provides operation, administration, maintenance, and provisioning functions for a 1xEV-DO network. Additionally, the system 100 may include one or more multiplexers (not shown) connected between the BTS 130 and the router 140 for performing protocol translations.

Unless specifically stated otherwise, or as is apparent from the discussion, terms such as "processing" or "computing" or "calculating" or "determining" or "displaying" or the like, refer to the action and processes of a computer system, a digital data processor, a digital signal processor, an integrated circuit (e.g., an application-specific integrated circuit (ASIC) or a Field Programmable Gate Array (FPGA)), or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
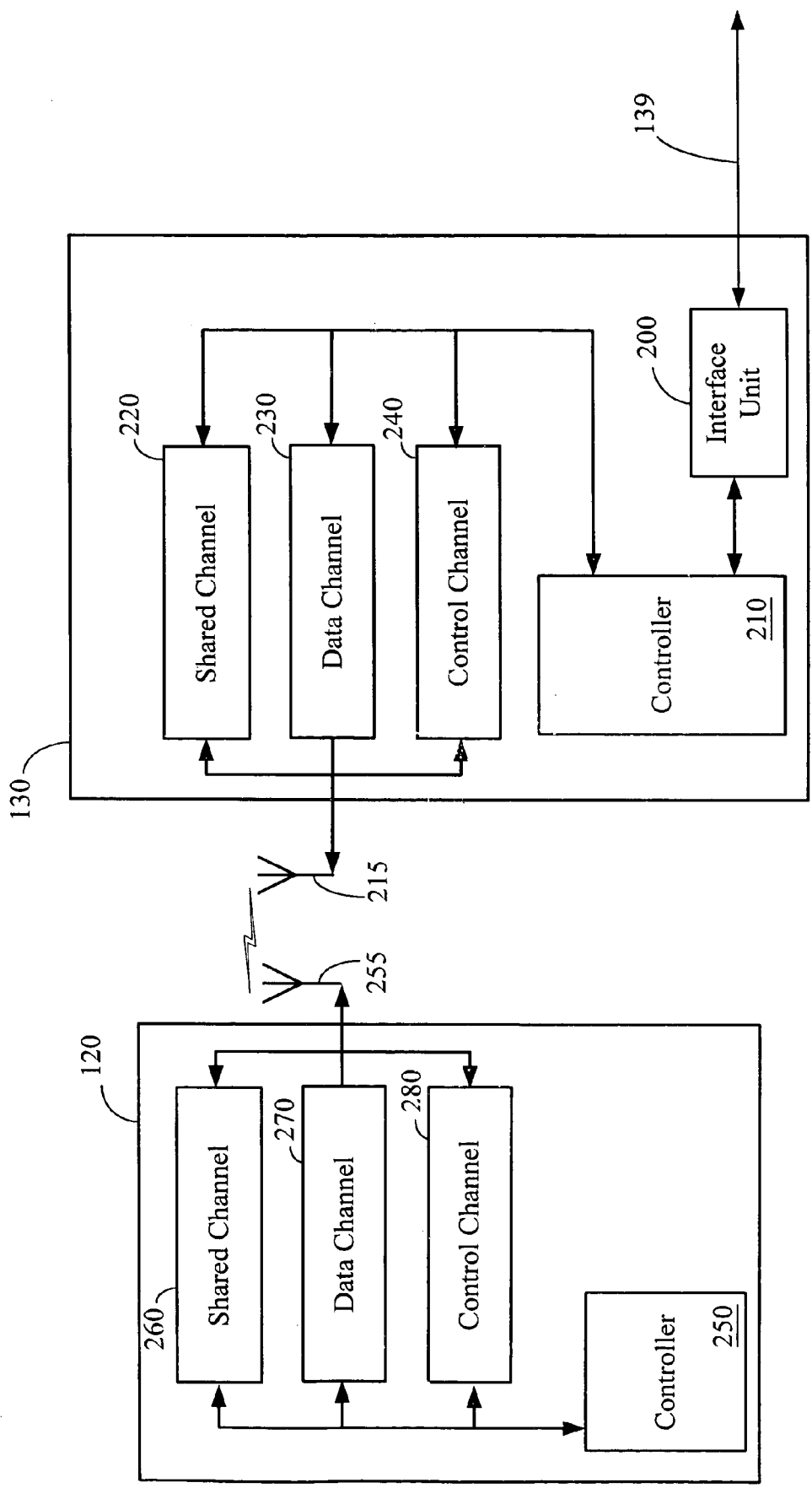
FIG. 2 depicts a block diagram of one embodiment of a base station and an access terminal used in the communications system of FIG. 1.

Referring now to FIG. 2, a block diagram of one exemplary embodiment of a functional structure associated with an exemplary BTS 130 and access terminal 120 is shown. The BTS 130 includes an interface unit 200, a controller 210, an antenna 215 and a plurality of channels: a shared channel 220, a data channel 230, and a control channel 240. The interface unit 200, in the illustrated embodiment, controls the flow of information between the BTS 130 and the SRNC 138 (see FIG. 1). The controller 210 generally operates to control both the transmission and reception of data and control signals over the antenna 215 and the plurality of channels 220, 230, 240 and to communicate at least portions of the received information to the RNC 138 via the interface unit 200.

The access terminal 120 shares certain functional attributes with the BTS 130. For example, the access terminal 120 includes a controller 250, an antenna 255 and a plurality of channels: a shared channel 260, a data channel 270, and a control channel 280. The controller 250 generally operates to control both the transmission and reception of data and control signals over the antenna 255 and the plurality of channels 260, 270, 280.

Normally, the channels 260, 270, 280 in the access terminal 120 communicate with the corresponding channels 220, 230, 240 in the base station 130. Under the operation of the controllers 210, 250 the channels 220, 260; 230, 270; 240, 280 are used to effect a controlled time scheduling for communications between the access terminal 120 and the base station 130. For example, the shared channel 280 is generally used by the access terminal 120 to request permission to transmit data and/or control information to the base station 130. The control channel 220 is used by the base station 130 to notify the access terminal 120 of the circumstances under which it may transmit to the base station 130 via the data and control channels 270, 280.

One process that may be used to control the scheduling and decoding of information delivered over one or all of these channels is described in greater detail in conjunction with FIGS. 3 through 7 below. The process described below may be implemented in hardware, software or a combination thereof and may be implemented in the controllers 210, 250 within each of the access terminal 120 and the BTS 130.

Figure 3:
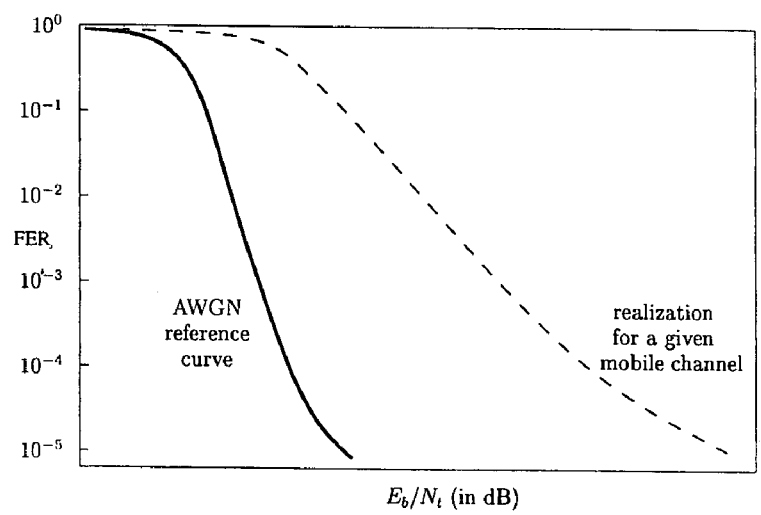
FIG. 3 illustrates an exemplary reference curve for a given number of information bits and channel code rate under additive white Gaussian noise (AWGN) channel assumption.
Figure 4A:
FIGS. 4A and 4B illustrate two distinct waveforms, each with the same average $E_b/N_t$ over a frame.
Figure 4B:

Turning now to the issue of predicting the error rate when information is transmitted over the channels in the wireless link between the access terminal 120 and the BTS 130, one embodiment of a method that may be employed involves obtaining an average signal to noise ratio for a modulation symbol ($E_s/N_t$, where $E_s$ denotes the energy per modulation symbol and $N_t$ denotes the total noise energy) over at least one frame. An average signal to noise ratio for each information bit ($E_b/N_t$, where $E_b$ is the energy per information bit) may be determined by multiplying the average $E_s/N_t$ by the number of modulation symbols per information bit ($G_s$). Thereafter, $E_b/N_t$ may be used in a look-up table or reference curve, such as of the type shown in FIG. 3, to determine the frame error rate (FER). Those skilled in the art will appreciate that multiple reference curves, such as those illustrated in FIG. 3, may be necessary to accurately predict the FER. For example, as shown in FIG. 3, FER curves for a given number of information bits and a given error control code are shown for the AWGN channel (300) and a fading channel (302). Thus, depending upon the channel conditions the FER curves may show substantial differences and therefore the FER for a given (average) $E_b/N_t$ may differ significantly. The more the channel gain varies, the worse the performance is. For example, consider two cases with the same average $E_b/N_t$ over a frame, as represented by the waveforms shown in FIGS. 4A and 4B. In the waveform illustrated in FIG. 4A, the channel gain does not vary, whereas in the waveform shown in FIG. 4B, the channel gain varies substantially, but both have the same average $E_b/N_t$. And yet, the system will provide better performance (e.g., fewer errors) when the channel gain does not vary, as shown in FIG. 4A.

Figure 5:
FIG. 5 illustrates a stylistic representation of a frame being divided into M segments.

In an alternative embodiment of a method that may be used to predict errors that may occur in the transmission of information over the wireless link between the access terminal 120 and the BTS 130, it may be useful to subdivide a frame and perform separate calculations on each of the subdivisions, rather than performing the analysis on the entire frame as discussed above. In one implementation, the frame is divided into multiple segments, such as M separate segments, as is shown in FIG. 5.

Each segment has an average symbol energy to total noise power ratio $E_s/N_t$, as follows:

$$\left(\frac{E_s}{N_t}\right)_1, \left(\frac{E_s}{N_t}\right)_2, \left(\frac{E_s}{N_t}\right)_3, \ldots, \left(\frac{E_s}{N_t}\right)_M \tag{1}$$

where $(E_s/N_t)_m$ denotes the average $E_s/N_t$ for the m-th segment. Since wireless channel conditions are not steady, each segment is likely to have a different $E_s/N_t$. In general, greater variations of $(E_s/N_t)_m$ cause worse decoding performance. Or, in other words, large variations of $(E_s/N_t)_m$ mean that the communication channel will not perform well. In the instant embodiment of the invention, the intent is to provide a way to penalize the average $E_s/N_t$ over a frame due to $(E_s/N_t)_m$ variations. That is, where variations in $E_s/N_t$ exist between the segments, then a lower $E_s/N_t$ for the entire frame should be produced, more accurately predicting the performance of the channel.

In one embodiment of the instant invention an effective average $(E_s/N_t)_F$ over a frame may be calculated using a simple average, such as $$\left(\frac{E_s}{N_t}\right)_F = \frac{1}{M}\sum_{m=1}^{M}\left(\frac{E_s}{N_t}\right)_m \tag{2}$$

However, the simple average of equation (2) does not take $E_s/N_t$ variations within the frame into account.

It may be useful to employ a convex function $f(.)$ to weight the segments such that a larger $E_s/N_t$ for the frame is produced when variations occur between the segments. An exemplary convex function is described more fully below. A variable $C_m$ is defined as $$C_m = f\!\left(Q\cdot\left(\frac{E_s}{N_t}\right)_m\right) \tag{3}$$

where Q is a correction factor. If Q=1, there is no correction factor. C may be obtained by averaging $C_m$.

$$C = \frac{1}{M}\cdot\sum_{m=1}^{M} C_m \tag{4}$$

And the new effective $(E_s/N_t)_F$ can be obtained as:

$$\left(\frac{E_s}{N_t}\right)_F = \frac{1}{Q} f^{-1}(C) \tag{5}$$

where $f^{-1}(.)$ is the inverse function of $f(.)$. Thus, $(E_s/N_t)_F$ has its maximum when all $(E_s/N_t)_m$ have the same value.

The final effective $E_b/N_t$ may then be obtained for use in the lookup table. Let $(E_s/N_t)_F$ be the final effective $E_b/N_t$, then $(E_s/N_t)_F$ can be obtained as $$\left(\frac{E_b}{N_t}\right)_F = G_s\cdot\left(\frac{E_s}{N_t}\right)_F \tag{6}$$

Then we can obtain the FER by applying $(E_b/N_t)_F$ to an AWGN reference curve.

An exemplary convex function $f(.)$ that may be employed in the instant invention may be obtained using Shannon's channel capacity formula. Channel capacity formulas are different for different modulation formats. They are described in the following.

1. Gaussian Signaling.

$$f(x)=\log_2(1+x) \text{ and } f^{-1}(y)=2^y-1 \tag{7}$$

2. BPSK Modulation $$f(u) \approx \begin{cases} a_1 u^3 + b_1 u^2 + c_1 u, & \text{if } u \le 1.6363 \\ 1 - \exp(a_2 u^3 + b_2 u^2 + c_2 u + d_2) & \text{if } 1.6363 \le u \le \infty \end{cases} \quad (8)$$

$$u = \sqrt{8x}$$

where $a_1 = -0.0421061$, $b_1 = 0.209252$ and $c_1 = -0.00640081$ for the first approximation, and where $a_2 = 0.00181491$, $b_2 = -0.142675$, $c_2 = -0.0822054$ and $d_2 = 0.0549608$ for the second approximation.

In a similar fashion, the inverse of $f(u)$ can be determined by using the following approximation:

$$f^{-1}(y) \approx \begin{cases} a_3 y^2 + b_3 y + c_3 \sqrt{y}, & \text{if } 0 \le y \le 0.3646 \\ a_4 \ln(b_4(y-1)) + c_4 y & \text{if } 0.3646 \le y \le 1 \end{cases} \quad (9)$$

Where $a_3 = 1.09542$, $b_3 = 0.214217$ and $c_1 = 2.33727$ for the first approximation, and where $a_4 = -0.706692$, $b_4 = -0.386013$ and $C_4 = 1.75017$ for the second approximation.

3. QPSK Modulation

In case of QPSK, the convex function is derived from BPSK case. The relationships are described in the following equation.

$$f_{QPSK}(x) = 2 \cdot f_{BPSK}(0.5 \cdot x) \quad (10)$$

Whenever the received signal is decoded in error, additional signals or the same signals may be re-transmitted. This physical layer re-transmission is sometimes referred to as hybrid automatic retransmission request (H-ARQ). In some applications, the multiple transmitted frames are combined before decoding. There are two classes of H-ARQ based on the combining scheme. One is Chase combining and the other is Incremental Redundancy (IR). The principals of the instant invention may be applied to accurately predict the link error probability in not only the original signal but also in the retransmitted signal and/or any combination formed thereof. Similarly, the principals of the instant invention may also be applied to accurately predict link errors in a signal that is a combination of a plurality of substantially identical signals received over different paths and different antennas (e.g., multiple antenna scenarios).

Chase Combining

Figure 6:
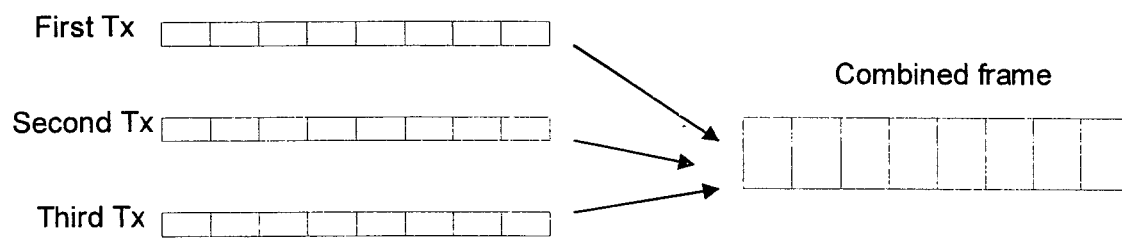
FIG. 6 is a stylistic block diagram illustrating the principle of Chase combining in a hybrid automatic retransmission request (H-ARQ)

In Chase combining, the same signals are retransmitted, and the retransmitted signals are then combined to form a single signal, as illustrated in FIG. 6. Let $A_{m,k}$ and $N_{m,k}$ denote the average symbol amplitude and noise energy per symbol of k-th transmission on m-th segment. Then, the average symbol SNR of the k-th transmission for the m-th segment is $$\frac{A_{m,k}^2}{N_{m,k}},$$

where $A_m$ and $N_m$ denote the average signal amplitude and noise variance in the m-th segment after Chase combining, which can be calculated as $$A_m = \sum_{k=1}^{K} A_{m,k}, \quad N_i = \sum_{k=1}^{K} N_{m,k} \quad (11)$$

where K is the total number of transmissions. Then, we apply equation (12) for calculating effective $E_s/N_t$ of the m-th slot, which is calculated as $$\left(\frac{E_s}{N_t}\right)_i = \frac{A_i^2}{N_i} \quad (12)$$

Incremental Redundancy (IR)

Figure 7:
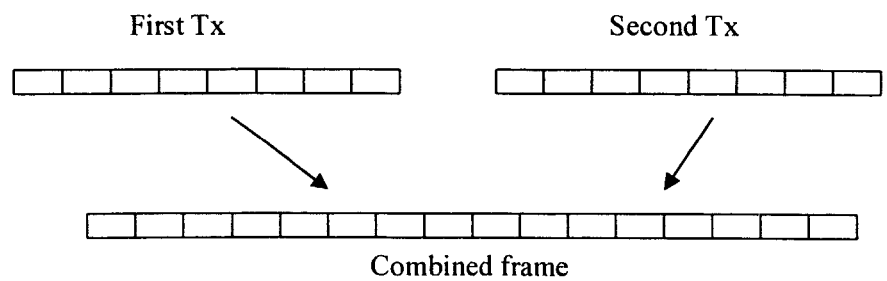
FIG. 7 is a stylistic block diagram illustrating the principle of Incremental Redundancy (IR) in a hybrid automatic retransmission request (H-ARQ)

In case of IR, additional parity information is sent if the first transmission is decoded in error so that the effective channel code rate decreases. The combining scheme is illustrated in FIG. 7. Assuming that there are in total K transmissions and that each transmission has h(k) number of slots (where k=1,2, ... ,K), and there is no overlapping of transmitted symbols, then, the method is applied as if there is a single transmission of $L_K$ slots where $$L_K = \sum_{k=1}^{K} h(k).$$

The reference channel code rate is the effective code rate after all K transmissions. If there are overlapping symbols, we apply the Chase combining metric for that overlapping portion.

Those skilled in the art will appreciate that the various system layers, routines, or modules illustrated in the various embodiments herein may be executable control units (such as the controllers 210, 250 (see FIG. 2)). The controllers 210, 250 may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by a respective control unit 210, 250 causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention.

Accordingly, the protection sought herein is as set forth in the claims below.

We claim:

1. A method, comprising:
receiving a first encoded signal;
predicting link errors based on at least one characteristic of the first encoded signal and variations in the at least one characteristic before decoding the first encoded signal; and
requesting a retransmission of the first encoded signal based on the predicted link errors.

2. A method, as set forth in claim 1, wherein predicting link errors based on at least one characteristic of the first encoded signal further comprises predicting link errors based on a signal to noise ratio of the first encoded signal.

3. A method, as set forth in claim 2, wherein predicting link errors based on the signal to noise ratio of the first encoded signal further comprises increasing the predicted number of link errors in response to detecting variations in the signal to noise ratio.

4. A method, as set forth in claim 2, wherein predicting link errors based on the signal to noise ratio of the first encoded signal further comprises:
dividing the first encoded signal into a plurality of segments;
determining the signal to noise ratio for each segment; and
applying a weighting factor to the signal to noise ratio within each segment based on variations in the signal to noise ratio within each segment.

5. A method, as set forth in claim 4, wherein applying a weighting factor to the signal to noise ratio within each segment based on variations in the signal to noise ratio within each segment further comprises using a convex function.

6. A method, as set forth in claim 1, wherein receiving the first encoded signal further comprises receiving a retransmitted encoded signal.

7. A method, as set forth in claim 1, wherein receiving the first encoded signal further comprises:
receiving an original encoded signal;
receiving a retransmitted encoded signal; and
combining the original and retransmitted encoded signals to form the first encoded signal.

8. A method, as set forth in claim 7, wherein combining the original and retransmitted encoded signals to form the first encoded signal further comprises combining the original and retransmitted encoded signals using Chase combining to form the first encoded signal.

9. A method, as set forth in claim 7, wherein combining the original and retransmitted encoded signals to form the first encoded signal further comprises combining the original and retransmitted encoded signals using incremental redundancy to form the first encoded signal.

10. A method, as set forth in claim 1, wherein receiving the first encoded signal further comprises:
receiving a first original encoded signal over a first path;
receiving a second original encoded signal over a second path; and
combining the first and second original encoded signals to form the first encoded signal.

11. An apparatus, comprising:
means for receiving a first encoded signal;
means for predicting link errors based on at least one characteristic of the first encoded signal before decoding the first encoded signal; and
means for requesting a retransmission of the first encoded signal based on the predicted link errors.

12. A method, comprising:
receiving a first encoded signal;
predicting link errors based on a signal to noise ratio of the first encoded signal and variations in the signal to noise ration of the first encoded signal before decoding the first encoded signal; and
requesting a retransmission of the first encoded signal based on the predicted link errors.

13. A method, as set forth in claim 12, wherein predicting link errors based on a signal to noise ratio of the first encoded signal and variations in the signal to noise ration of the first encoded signal before decoding the first encoded signal further comprises:
dividing the first encoded signal into a plurality of segments;
determining the signal to noise ratio for each segment; and
applying a weighting factor to the signal to noise ratio within each segment based on variations in the signal to noise ratio within each segment.

14. A method, as set forth in claim 13, wherein applying a weighting factor to the signal to noise ratio within each segment based on variations in the signal to noise ratio within each segment further comprises using a convex function.

15. A method, as set forth in claim 12, wherein receiving the first encoded signal further comprises receiving a retransmitted encoded signal.

16. A method, as set forth in claim 12, wherein receiving the first encoded signal further comprises:
receiving an original encoded signal;
receiving a retransmitted encoded signal; and
combining the original and retransmitted encoded signals to form the first encoded signal.

17. A method, as set forth in claim 16, wherein combining the original and retransmitted encoded signals to form the first encoded signal farther comprises combining the original and retransmitted encoded signals using Chase combining to form the first encoded signal.

18. A method, as set forth in claim 16, wherein combining the original and retransmitted encoded signals to form the first encoded signal farther comprises combining the original and retransmitted encoded signals using incremental redundancy to form the first encoded signal.

19. A method, as set forth in claim 12, wherein receiving the first encoded signal further comprises:
receiving a first original encoded signal over a first path;
receiving a second original encoded signal over a second path; and
combining the first and second original encoded signals to form the first encoded signal.

* * * * *